United States Patent
Hein et al.

(10) Patent No.: US 6,874,985 B2
(45) Date of Patent: Apr. 5, 2005

(54) CAPTIVE NUT ASSEMBLY

(75) Inventors: James R. Hein, Tucson, AZ (US); Karl W. Beltz, Tucson, AZ (US); Robert F. Salazar, Tucson, AZ (US)

(73) Assignee: Huck International, Inc., Tuscon, AZ (US)

( * ) Notice: Subject to any disclaimer, the term of this patent is extended or adjusted under 35 U.S.C. 154(b) by 128 days.

(21) Appl. No.: 10/310,541

(22) Filed: Dec. 4, 2002

(65) Prior Publication Data

US 2004/0109725 A1 Jun. 10, 2004

(51) Int. Cl.⁷ .................................................. F16B 19/00
(52) U.S. Cl. .................... 411/371.2; 411/374; 411/408; 411/410
(58) Field of Search ............................ 411/371.2, 372.5, 411/372.6, 373, 374, 377, 408, 402, 410

(56) References Cited

U.S. PATENT DOCUMENTS

| | | | |
|---|---|---|---|
| 3,986,544 A | 10/1976 | Jones et al. | |
| 4,031,935 A | 6/1977 | Jones et al. | |
| 4,261,402 A | 4/1981 | Stanaitis | |
| 4,413,374 A | * 11/1983 | Ferdinand et al. | ............ 16/441 |
| 4,464,091 A | 8/1984 | Molina | |
| 4,509,890 A | 4/1985 | Hill | |
| 4,557,653 A | 12/1985 | Hill | |
| 4,611,379 A | * 9/1986 | Heitzman | .................. 29/426.5 |
| 4,749,321 A | * 6/1988 | Knohl et al. | .............. 411/371.1 |
| 4,877,364 A | 10/1989 | Sorrentino | |
| 4,952,107 A | 8/1990 | Dupree | |
| 5,393,183 A | 2/1995 | Hinton | |
| 5,611,654 A | 3/1997 | Frattarola et al. | |
| 5,642,972 A | 7/1997 | Ellis et al. | |
| 5,682,678 A | * 11/1997 | Gallagher et al. | ....... 29/897.32 |
| 5,688,091 A | 11/1997 | McKinlay | |
| 5,865,582 A | 2/1999 | Ellis et al. | |
| 6,030,161 A | 2/2000 | Udell et al. | |
| 6,079,920 A | 6/2000 | Dispenza | |
| 6,318,942 B1 | * 11/2001 | Wieczorek | .................. 411/431 |

* cited by examiner

*Primary Examiner*—John R. Cottingham
(74) *Attorney, Agent, or Firm*—David P. Maivald; Eckert Seamans Cherin & Mellott, LLC

(57) ABSTRACT

A captive nut assembly that allows removal of one or more workpieces and/or provides access to an area between a plurality of workpieces is provided. The captive nut assembly includes a screw with an elongated shank that is adapted to be located in an opening of one or more workpieces and terminates at one end in an enlarged head. The shank has a threaded portion adapted to be secured to an other workpiece. The captive nut assembly also includes a captive nut that is rotatably mounted on the threaded portion of the screw and moveable along the shank of the screw with the head of the screw being located within the bore of the captive nut.

12 Claims, 5 Drawing Sheets

CAPTIVE NUT ASSEMBLY

FIELD OF THE INVENTION

The present invention relates to a captive nut assembly that is used to secure a plurality of workpieces together. The captive nut assembly consists of a captive nut rotatably attached to a screw.

BACKGROUND OF THE INVENTION

In many applications, it is often desirable to obtain access to the area between a plurality of workpieces and/or to remove a workpiece in order to perform maintenance, repair or other work on electrical distribution systems, lighting systems or other systems located between the plurality of workpieces or on the plurality of workpieces. Currently, it is common practice to secure a knurled head thumb screw to a first workpiece. Next, an opening in a second workpiece is disposed around the shank of the thumb screw and the thumb screw is rotatably tightened to secure the first and second workpieces together. When it becomes necessary to obtain access to the electrical distribution systems, lighting systems or any other systems located between the plurality of workpieces or on the plurality of workpieces to perform routine maintenance, repair or other work, the thumb screw is rotatably loosened to gain access to such systems or to remove a workpiece. Unintentionally, the thumb screw is oftentimes rotatably detached from the first workpiece. Detachment of the thumb screw allows the plurality of workpieces to fall upon the individual that rotatably detached the thumb screw. Personal injury to the individual performing maintenance, repair or other work could result from such an event. Also, property damage to the workpieces and the surface upon which the workpieces land could occur from such an occurrence. A need exists in the industry for a captive nut assembly that does not rotatably detach from a workpiece in order to overcome the limitations of the prior art.

SUMMARY OF THE INVENTION

It is an object of the invention to provide a captive nut assembly that does not rotatably detach from a workpiece.

It is another object of the invention to provide a captive nut assembly that has a captive nut that does not rotatably detach from a screw.

It is an additional object of the invention to provide a captive nut assembly that allows removal of one or more workpieces from a plurality of workpieces.

It is yet another object of the invention to provide a captive nut assembly that provides access to an area located between a plurality of workpieces.

These and other objects of the invention are obtained by providing a captive nut assembly that allows removal of one or more workpieces and/or provides access to an area between a plurality of workpieces. The captive nut assembly includes a screw with an elongated shank that is adapted to be located in an opening of one or more workpieces and terminates at one end in an enlarged head. The shank has a threaded portion adapted to be secured to another workpiece. The captive nut assembly also includes a captive nut that is rotatably mounted on the threaded portion of the screw and moveable along the shank of the screw with the head of the screw being located within the bore of the captive nut.

DETAILED DESCRIPTION OF PREFERRED EMBODIMENTS

Figure 1:
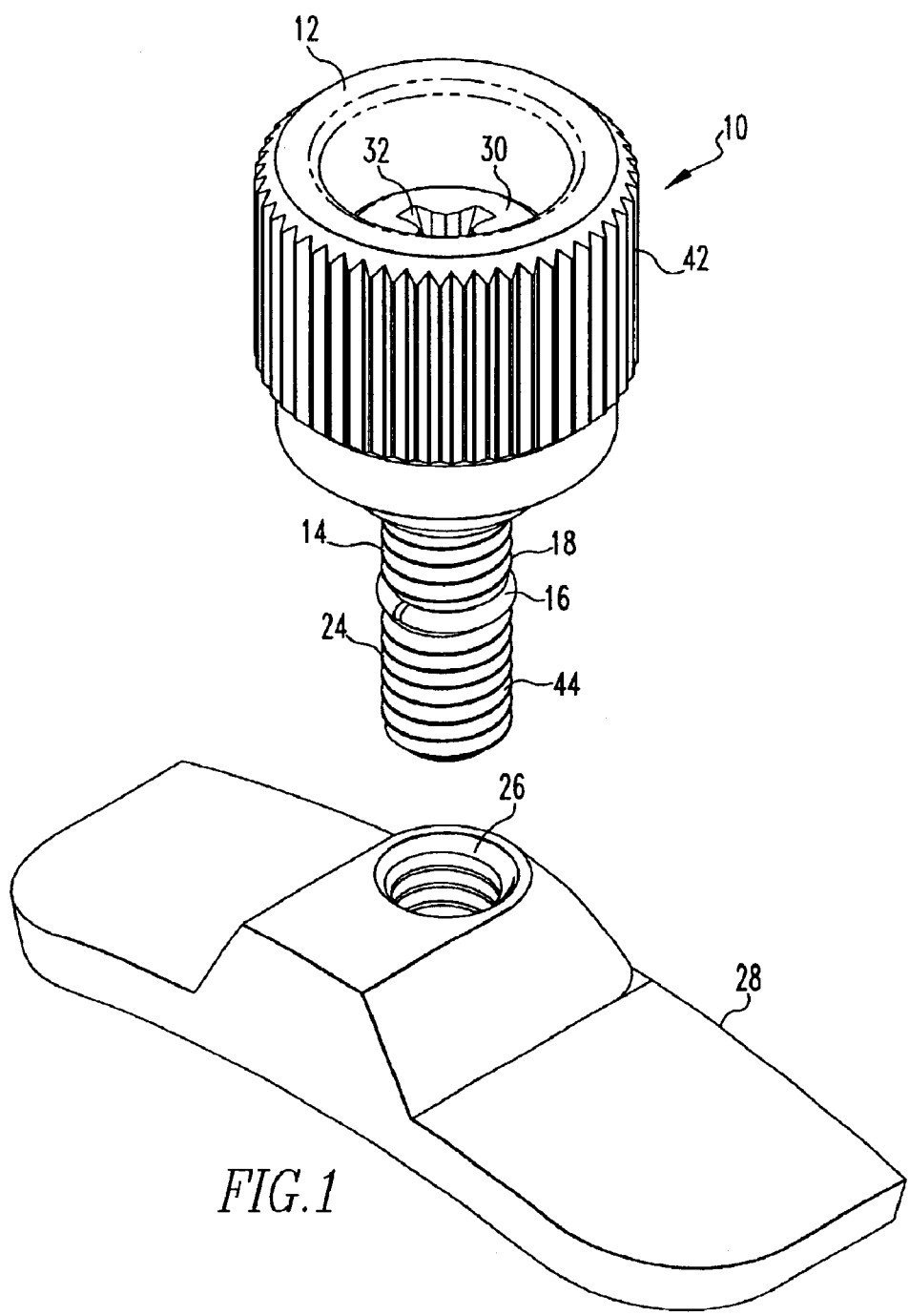
FIG. 1 is a perspective view of the captive nut assembly showing the captive nut assembly prior to being secured to a workpiece.
Figure 2:
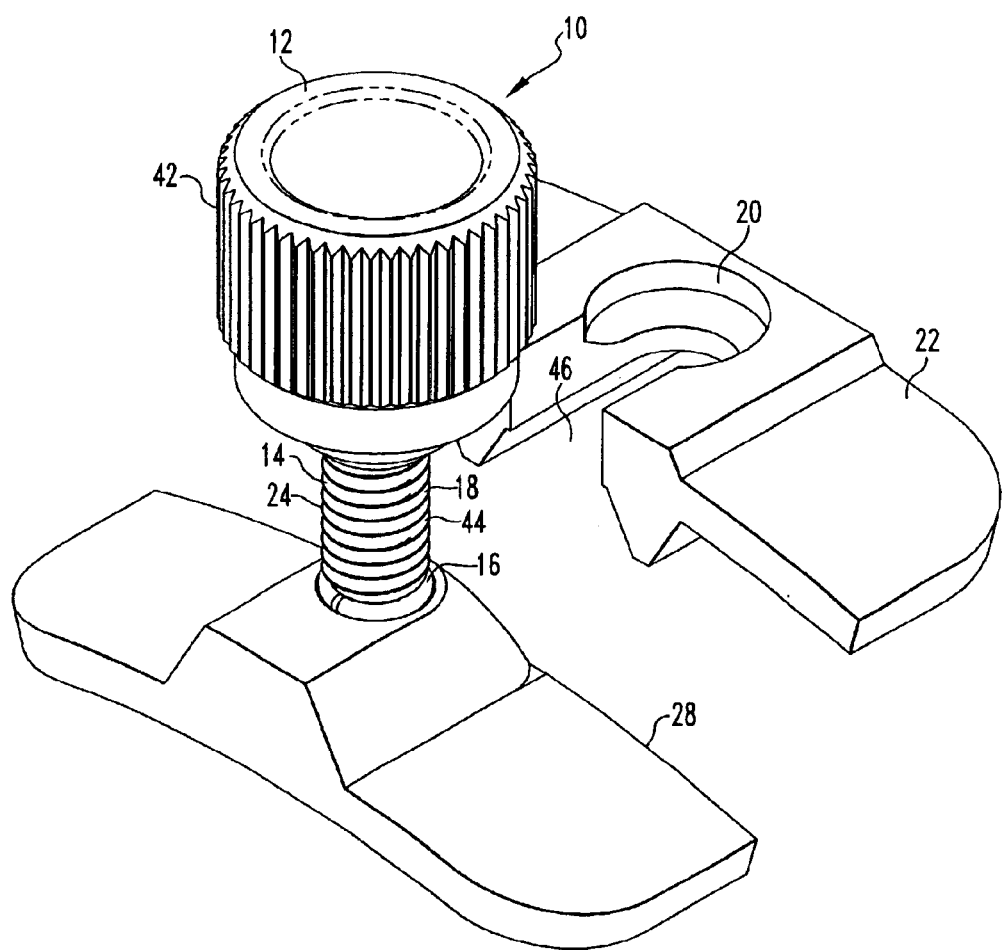
FIG. 2 is a perspective view of the captive nut assembly showing the captive nut assembly secured to a workpiece with another workpiece to be disposed around the shank of the screw.
Figure 3:
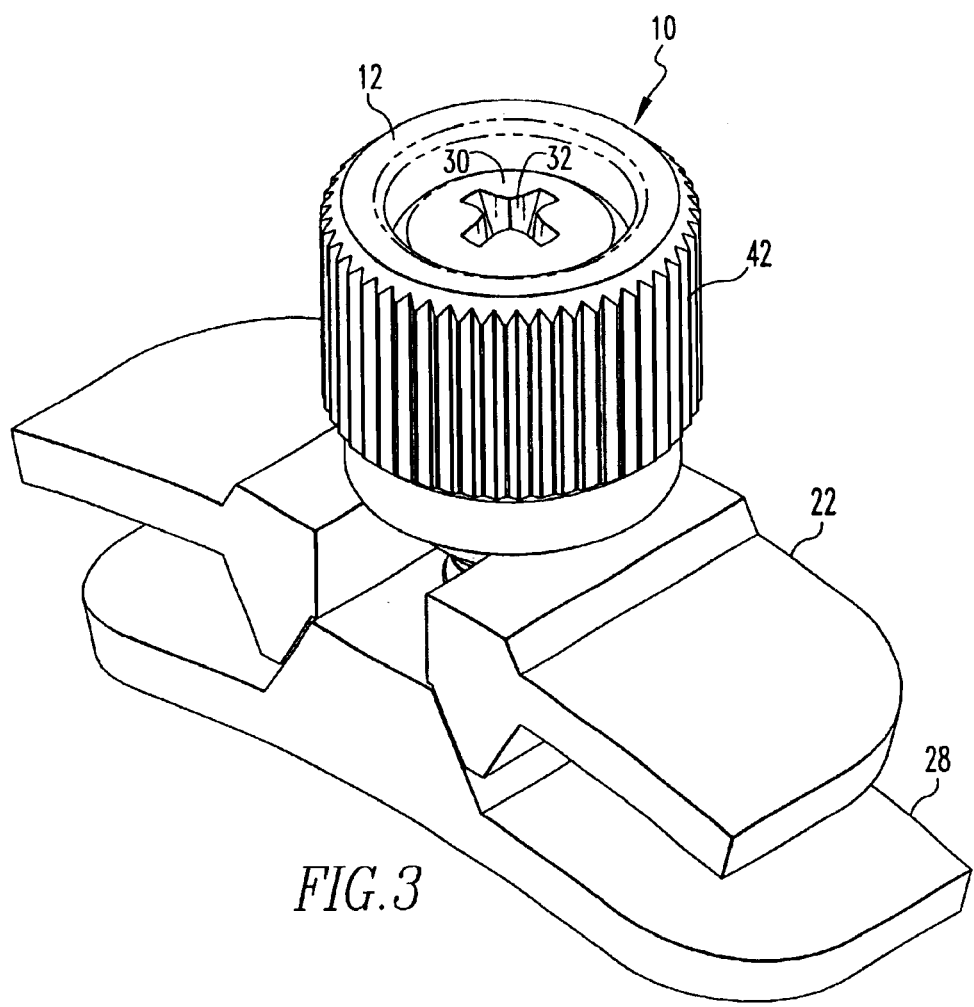
FIG. 3 is a perspective view of the captive nut assembly showing the captive nut assembly secured to a workpiece with another workpiece disposed around the shank of the screw.
Figure 4:
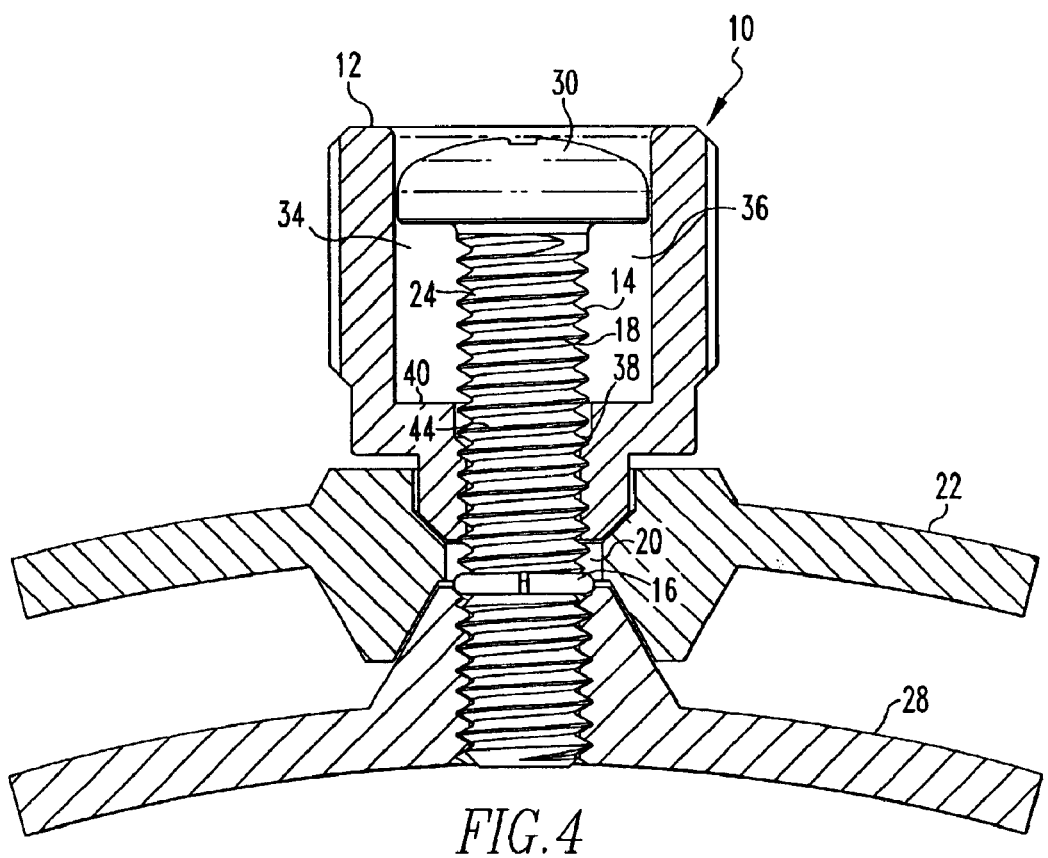
FIG. 4 is a cross sectional view of the captive nut assembly showing the captive nut assembly secured to a workpiece with another workpiece disposed around the shank of the screw wherein the plurality of workpieces are secured together.

Looking now to FIGS. 1 to 3, a captive nut assembly 10 is shown to include a captive nut 12 and a screw 14. Optionally, a washer 16 can be used in the captive nut assembly 10 to assist in securing the captive nut assembly 10 to a workpiece 28. As shown in FIG. 4, screw 14 has an elongated shank 18 which extends through an opening 20 in a first workpiece 22. The screw 14 is provided with a thread 24 that is adapted to threadedly engage a threaded bore 26 of a second workpiece 28. The screw 14 also has an enlarged head 30 at one end of the shank 18. The head 30 is shown with a driving surface 32. While the driving surface 32 is shown as a "PHILLIPS" type driving surface 32, any other type of driving surface could be employed on the head 30 such as a slotted drive, hex drive, etc. These other driving surfaces should be considered to be encompassed by the scope of the present invention as well.

Figure 5:
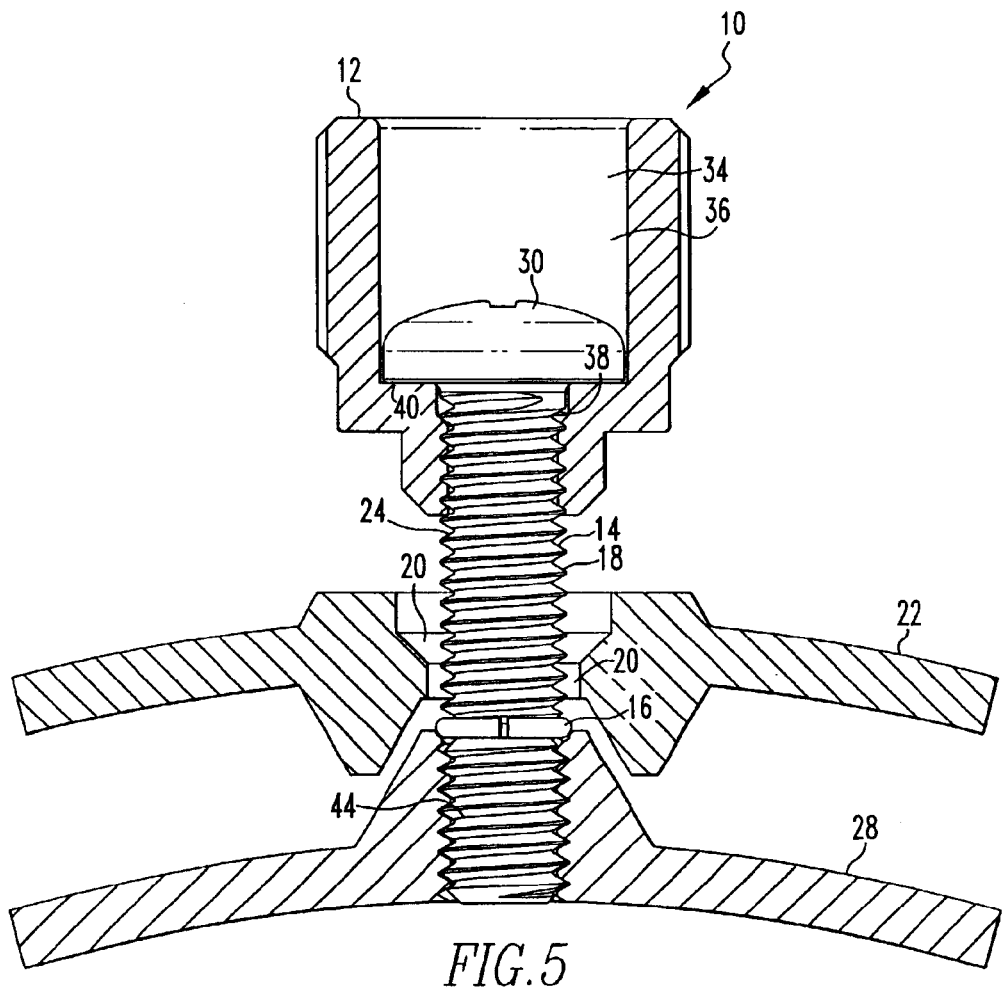
FIG. 5 is a cross sectional view of the captive nut assembly showing the captive nut assembly secured to a workpiece with another workpiece disposed around the shank of the screw wherein the other workpiece could be removed from around the shank of the screw.

Rotatably mounted on the screw 14 is the captive nut 12. The captive nut 12 has a bore 34 that extends through the captive nut 12. The bore 34 has a larger diameter portion 36 that transitions to a smaller diameter portion 38 with a step 40. As shown in FIGS. 4–5, a portion of the smaller diameter portion 38 is threaded. While a portion of the smaller diameter portion 38 is shown as threaded, the entire smaller diameter portion 38 could be threaded as well. Optionally disposed on the outer circumference of the captive nut 12 are axially scored lines 42 to facilitate tightening of the captive nut 12 by only using fingers without any tools. Alternatively, the outer surface of the captive nut 12 could be knurled, notched or provided with any number of alternative frictional surfaces to facilitate tightening of the captive nut 12 by only using fingers.

To rotatably mount the captive nut 12 on the screw 14, the thread 24 of the screw 14 is threadedly engaged with the thread of the smaller diameter portion 38 of the captive nut 12. A self locking element 44 is disposed on the shank 18 either before or after rotatably mounting the captive nut 12 on the screw 14. The self locking element 44 is preferably coated on the shank 18 and can be any one of a number of compounds that are designed to adhere the shank 18 of the screw 14 within the threaded bore 26. As shown in FIG. 2, after assembly of the captive nut assembly 10, the thread 24 of the screw 14 is threadedly engaged with the threaded bore 26 of the second workpiece 28 and the opening 20 of the first workpiece 22 is disposed around the shank 18. Alternatively, if notch 46 of the first workpiece 22 was not present in the first workpiece 22, the opening 20 of the first workpiece 22 and the threaded bore 36 could be placed in substantial alignment relative to each other and the shank 18 passed through the opening 20 and threadedly engaged with the threaded bore 26.

In an alternate embodiment, the second workpiece 28 could have a through bore that passes through the entire workpiece 28 instead of a threaded bore 26. In this embodiment, after assembly of the captive nut assembly 10, the shank 18 of the screw 14 would pass through the bore of the second workpiece 28 and would be secured to the workpiece 28 with a nut and the opening 20 would be disposed around the shank 18. Alternatively, if notch 46 of the first workpiece 22 was not present in the first workpiece 22, the opening 20 of the first workpiece 22 and the through bore of the second workpiece 28 could be placed in substantial alignment relative to each other and the shank 18 passed through the opening 20 and the bore of the second workpiece 28 and secured to the second workpiece 28 with a nut.

As shown in FIGS. 4–5, the captive nut assembly operates as follows. In the event it is desired to obtain access to the area between the first workpiece 22 and second workpiece 28 or to remove the first workpiece 22 to perform maintenance, repair or other work on electrical distribution systems, lighting systems or other systems located between the workpieces 22 and 28 or on the workpieces 22 and 28, the outer surface of the captive nut is grasped and rotatably moved along the axis of the shank 18. As shown in FIG. 5, the maximum extent the captive nut 12 can be rotatably moved along the shank 18 is to the point of engagement of the head 30 with the step 40. At this point, an individual could remove workpiece 22 to perform maintenance, repair or other work on electrical distribution systems, lighting systems or other systems located between the workpieces 22 and 28 or on the workpieces 22 and 28. Alternatively, workpiece 22 could be disposed against captive nut 12 to provide sufficient clearance between the workpieces 22 and 28 to allow an individual to perform maintenance, repair or other work on electrical distribution systems, lighting systems or other systems located between the workpieces 22 and 28 or on the workpieces 22 and 28. Use of the captive nut assembly 10 is desirable from the prior art knurled head thumb screw because the risk of rotatably detaching a thumb screw is eliminated. Therefore, the invention prevents personal injury that could occur from workpieces 22 and 28 falling on the individual performing maintenance, repair or other work. Also, the invention prevents property damage that could occur from workpieces 22 and 28 falling on the ground. It has been found desirable to manufacture the captive nut 12 and screw 14 from alloy steel. Alternatively, the captive nut 12 and screw 14 could be made of other metallic alloys, metallic materials, composites or plastics as well.

Having described the presently preferred embodiments, it is to be understood that the invention may be otherwise embodied within the scope of the appended claims.

What is claimed is:

1. A captive nut assembly for securing a plurality of workpieces together comprising:
   (a) a screw having an elongated shank adapted to be located in an opening of one or more workpieces and terminating at one end in an enlarged head, the shank having a threaded portion adapted to be secured to another workpiece, the head having a driving surface; and
   (b) a captive nut having a bore through the entire captive nut with a larger diameter portion transitioning to a smaller diameter portion by a step, the smaller diameter portion having a threaded portion adapted to engage the threaded portion of the screw, the captive nut being rotatably mounted on the threaded portion of the screw and moveable along the shank of the screw, the head of the screw being located within the bore of the captive nut.

2. The captive nut assembly of claim 1 wherein the captive nut has an outer circumference that has a means for facilitating tightening of the captive nut.

3. The captive nut assembly of claim 1 further comprising a means for securing the screw to the other workpiece.

4. The captive nut assembly of claim 1 further comprising a washer that is disposed around the shank of the screw.

5. The captive nut assembly of claim 1 wherein the captive nut assembly and the screw are manufactured from materials selected from the group consisting of alloy steel, metallic alloys, metallic materials, composites, plastics and combinations thereof.

6. A captive nut assembly for securing a plurality of workpieces together comprising:
   (a) a screw having an elongated shank adapted to be located in an opening of one or more workpieces and terminating at one end in an enlarged head, the shank having a threaded portion adapted to be secured to another workpiece, the head having a driving surface; and
   (b) a captive nut having an outer circumference that has a means for facilitating tightening of the captive nut and a bore through the entire captive nut with a larger diameter portion transitioning to a smaller diameter portion by a step, the smaller diameter portion having a threaded portion adapted to engage the threaded portion of the screw, the captive nut being rotatably mounted on the threaded portion of the screw and moveable along the shank of the screw, the head of the screw being located within the bore of the captive nut.

7. The captive nut assembly of claim 6 further comprising a means for securing the screw to the other workpiece.

8. The captive nut assembly of claim 6 further comprising a washer that is disposed around the shank of the screw.

9. The captive nut assembly of claim 6 wherein the captive nut assembly and the screw are manufactured from materials selected from the group consisting of alloy steel, metallic alloys, metallic materials, composites, plastics and combinations thereof.

10. A captive nut assembly for securing a plurality of workpieces together comprising:
    (a) a screw having an elongated shank adapted to be located in an opening of one or more workpieces and terminating at one end in an enlarged head, the shank having a threaded portion coated with a self locking element that is adapted to be engaged with a threaded bore located in another workpiece, the head having a driving surface; and
    (b) a captive nut having an outer circumference that has a means for facilitating tightening of the captive nut and a bore through the entire captive nut with a larger diameter portion transitioning to a smaller diameter portion by a step, the smaller diameter portion having a threaded portion adapted to engage the threaded portion of the screw, the captive nut being rotatably mounted on the threaded portion of the screw and moveable along the shank of the screw, the head of the screw being located within the bore of the captive nut.

11. The captive nut assembly of claim 10 further comprising a washer that is disposed around the shank of the screw.

12. The captive nut assembly of claim 10 wherein the captive nut assembly and the screw are manufactured from materials selected from the group consisting of alloy steel, metallic alloys, metallic materials, composites, plastics and combinations thereof.

* * * * *